Patented Aug. 13, 1935

2,011,345

UNITED STATES PATENT OFFICE 2,011,345

COMPOSITION OF ENHANCED AFFINITY FOR DYES

Carl J. Malm and Charles R. Fordyce, Rochester, N. Y., assignors to Eastman Kodak Company, Rochester, N. Y., a corporation of New York No Drawing. Application December 17, 1932, Serial No. 647,828

8 Claims. (Cl. 106—40)

The present invention relates to a composition of matter comprising a fatty acid ester of cellulose, such as cellulose acetate and a dicarboxylic ester of cellulose of the nature of cellulose acetate-phthalate or cellulose acetate-succinate, which composition is more susceptible to the action of dyes, especially those of a basic nature than the cellulose ester materials commonly employed commercially for filaments and skins or sheets.

At the present time large quantities of the secondary or hydrolyzed cellulose acetates are formed into filaments or sheets in commercial practice. It is often desirable especially in the case of the filaments that these products be colored. Many of the known dyes were unsuitable for the coloring and dyeing of these products and it was necessary that new dyes be developed for this purpose. Dyes were developed for this purpose, however, it was found that their performance especially in the case of the basic dyes, varied with the different samples of acetate products on which they were employed. In many cases the cellulose acetate would only be dyed to a comparatively light shade upon treatment with the dye. It has been stated that the fastness of the basic colors on cellulose acetate silk appears to follow closely the affinity of the dyestuff for the silk. Thus not only is the cellulose acetate only capable of being dyed lightly in those cases but the color would probably not remain unchanged for more than a limited period of time.

In view of this variation in the dye susceptibilities of various cellulose acetates, many of which are very unfavorable, we propose to solve the problem of non-uniformity of dyeing, presented by the above facts by preparing a composition having a satisfactory affinity to already existing dyes, in contrast to attempting to solve this problem by the preparation of further dyes which might be equally effective with all kinds of cellulose acetate materials which may be employed in this connection. One object of our invention is to prepare a composition containing cellulose acetate which may be readily and easily dyed by basic dyes which will only dye the cellulose acetate itself slowly if at all.

We have found that a composition comprising cellulose acetate containing approximately 10% to approximately 20% (based on the weight of the cellulose acetate) of a cellulose-acetate-dicarboxylate such as cellulose acetate phthalate is readily dyed by basic dyes and that a deep coloration may be obtained if desired in a comparatively short period. We have found that the time necessary to obtain a given shade with this composition containing a dicarboxylic acid ester of cellulose is considerably less with a given dye bath than has been formerly required to procure that shade when cellulose acetate was employed.

The following examples are illustrative of the susceptibility to dyes of the compositions embodied in the present invention:

*Example 1.*—25% solutions of a cellulose acetate phthalate containing 31% phthalyl and a cellulose acetate of 38% acetyl content in acetone were separately prepared. These solutions were mixed in the proportion of one part of the acetate phthalate solution to five parts of the acetate solution and filaments were spun and skins were coated from this mixture. Corresponding products were also prepared from the cellulose acetate and cellulose acetate phthalate, were treated in a warm basic fuchsin solution for two minutes and a deep red coloration of the products resulted. The products prepared using cellulose acetate alone were treated with a basic fuchsin solution of like composition and temperature, as before, also for two minutes. The products containing no cellulose acetate-phthalate exhibited a hardly noticeable red coloration.

The cellulose acetate-phthalate employed was prepared by treating a cellulose acetate having free and available hydroxyl groups with phthalic anhydride in the presence of a tertiary organic base, such method and the products resulting therefrom being disclosed and claimed in Malm and Waring application Serial No. 380,252 filed July 22, 1929.

*Example 2.*—A 20% solution or dope in acetone of an ordinary commercial acetone-soluble cellulose acetate was prepared and divided into two portions. To one portion 10% of a cellulose acetate-phthalate (based on the weight of the cellulose acetate) was added thereto. The two solutions were then formed into filaments by projecting each through a spinneret into an evaporative atmosphere in the well known manner. The two filaments were then treated in a scouring bath which contained 3 liters of water, 6 grams of neutral soap and 3 grams of ammonia solution (approximately 28%) for every 100 grams of yarn or filament to be treated. The mass was maintained at a temperature of 80–85° C. with gentle agitation for about 30 minutes. The filaments were removed from the bath and rinsed free of soap solution. It was then placed in a dye bath consisting of 0.5 gram of an anthraquinone dye of the dispersol type such as S. R. A.

blue IV powder, which dye may be represented by the formula

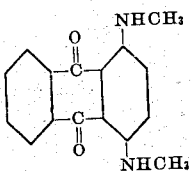

45 grams of soda ash, 6 cc. of Turkey red oil and a liter of soft water. The bath was at ordinary temperature when the yarn was placed therein. It was then brought up to a temperature of 80° C. over a period of 20 minutes and maintained at that temperature for 15 minutes with gentle agitation. It was found that the yarn containing the cellulose acetate-phthalate had almost exhausted the dye bath before much dyeing had taken place on the yarn comprising only the cellulose acetate. When samples of the two yarns were dyed separately it was found that the yarn containing the cellulose acetate phthalate dyed to a given shade in much less time than the yarn from which it had been omitted.

Instead of the acetate-phthalates of cellulose other cellulose esters of dicarboxylic acids may be employed in the present invention. For instance a cellulose acetate succinate such as described and claimed in Malm and Waring applications Serial Nos. 380,252 and 627,150 or a cellulose acetate dicarboxylate in which a heterogeneously linked dicarboxylic acid is employed such as a cellulose acetate diglycollate as described and claimed in Malm and Fordyce application Serial No. 627,147 may be employed. These cellulose acetate dicarboxylates are commonly prepared by reacting upon a cellulose acetate containing free and available hydroxyl groups with a dicarboxylic acid anhydride and an amount of a tertiary organic base such as pyridine, quinoline or the like sufficient to esterify the second carboxyl group, and then treating the resulting product which is a cellulose acetate pyridine dicarboxylate with an acid such as acetic which is strong enough to remove the pyridine from the compound.

In addition to testing the composition forming the subject of the present invention by coloring it by dispersol methods of dyeing, it was also compared with ordinary acetate by vat dyeing. For instance, a filament of cellulose acetate containing about 10% of cellulose acetate phthalate was dyed in the same bath as a cellulose acetate, the vat dye employed being ciba navy blue BN. The filament containing the cellulose acetate phthalate was found to exhibit a shade considerably darker than the filament containing cellulose acetate as the only cellulose ester present. The present composition has been found to have a greater affinity for the following types of dyes than does cellulose acetate: basic dyestuffs such as brilliant cresyl blue BB, color index No. 877, phthalic anhydride dyestuffs such as rhodamine B base, color index No. 749, diazotized and developed colors such as SRA black IV having the formula:

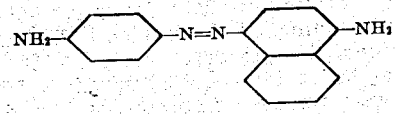

Filaments prepared from our composition may be employed for the manufacture of fabrics either entirely or together with threads of other material to give various effects. For instance, if a fabric is made containing both yarns or filaments of the present composition and of cellulose acetate, color effects will be procured upon the dyeing of that material. Fabrics may also be prepared from threads of the present composition totgether with threads of rayon or cotton or both, in which fabrics the threads of the present composition will exhibit a resist effect when the fabric is treated for instance with a direct cotton dyestuff.

Our composition may also be employed for the preparation of sheeting which may, if desired, be dyed and employed in any capacity desired, such as wrapping material, etc.

As is illustrated by the examples, our preferred composition comprises cellulose acetate containing from approximately 10% to approximately 20% of the cellulose acetate dicarboxylate (based on the weight of the cellulose acetate) although other proportions may be found satisfactory for particular purposes.

Our composition may also be employed for the various purposes for which cellulose ester compositions are employed such as artificial leather, photographic film support, lacquers, plastics, adhesives etc. it being especially adapted for use in instances where coloring of the ester composition is desired. They may be mixed with various materials such as plasticizers, other cellulose derivatives whether the acetate, nitrate, acetate-propionate or an ether of cellulose, resins, waxes, gums, fillers, etc., the only limitation being that the material must be compatible with the present composition.

If desired one may employ some other fatty acid ester of cellulose than cellulose acetate in the composition according to this invention. Esters such as cellulose acetate propionate, cellulose acetate-butyrate, cellulose propionate and cellulose butyrate suggest themselves to the individual as being suitable in the present composition to replace all or a part of the cellulose acetate which is usually employed.

Various other modifications, which are apparent to those skilled in the art, are also within the scope of the present invention.

The term "colloidized" as applied to products or materials herein refers to a material which has been dissolved in a volatile solvent and from which solution the solvent has been evaporated. For example if the composition constituting the present invention were dissolved in acetone and a filament were formed from this solution by evaporative spinning the material formed would be regarded as colloidized.

We claim as our invention:

1. A composition of matter which comprises a fatty acid ester of cellulose and a cellulose ester containing a dicarboxylic acid radical, one of the carboxyl groups of which is unesterified, the latter being present in a proportion sufficient to give substantially greater susceptibility to dyeing with basic dyes, than does cellulose acetate.

2. A composition of matter which comprises a fatty acid ester of cellulose and a cellulose ester containing a phthalic acid radical, one of the carboxyl groups of which is unesterified, the latter being present in a proportion sufficient to give substantially greater susceptibility to dyeing with basic dyes, than does cellulose acetate.

3. A composition of matter which comprises a fatty acid ester of cellulose and cellulose acetate-phthalate having an unesterified carboxyl group, the latter being present in a proportion sufficient to give substantially greater susceptibility to dyeing with basic dyes, than does cellulose acetate.

4. An artificial silk filament which comprises a fatty acid ester of cellulose and a cellulose ester containing a dicarboxylic acid radical, one of the carboxyl groups of which is unesterified, the latter being present in a proportion sufficient to give substantially greater susceptibility to dyeing with basic dyes, than does cellulose acetate.

5. A colloidized article of manufacture which comprises a fatty acid ester of cellulose and a cellulose ester containing a phthalic acid radical, one of the carboxyl groups of which is unesterified, the latter being present in a proportion sufficient to give substantially greater susceptibility to dyeing with basic dyes, than does cellulose acetate.

6. A dyed composition of matter which comprises a fatty acid ester of cellulose and a cellulose ester containing a dicarboxylic acid radical, one of the carboxyl groups of which is unesterified, the latter being present in a proportion sufficient to give substantially greater susceptibility to dyeing with basic dyes, than does cellulose acetate.

7. A dyed artificial silk filament which comprises a fatty acid ester of cellulose and a cellulose ester containing a phthalic acid radical, one of the carboxyl groups of which is unesterified, the latter being present in a proportion sufficient to give substantially greater susceptibility to dyeing with basic dyes, than does cellulose acetate.

8. A dyed artificial silk filament which comprises a fatty acid ester of cellulose and 10%–20% (based on the weight of the fatty acid ester) of cellulose acetate-phthalate having an unesterified carboxyl group, the latter being present in a proportion sufficient to give substantially greater susceptibility to dyeing with basic dyes, than does cellulose acetate.

CARL J. MALM.
CHARLES R. FORDYCE.